United States Patent [19]

Toyoda et al.

[11] 4,338,133

[45] Jul. 6, 1982

[54] JET PRINTING INK COMPOSITION

[75] Inventors: Tsunehiko Toyoda, Yokohama; Tokio Matsumoto, Tokyo; Toshiaki Arakawa, Yokosuka, all of Japan

[73] Assignee: Dai Nippon Toryo Co., Ltd., Osaka, Japan

[21] Appl. No.: 258,395

[22] Filed: Apr. 28, 1981

[30] Foreign Application Priority Data

Nov. 25, 1980 [JP] Japan .............................. 55/165657

[51] Int. Cl.$^3$ .................... C09D 11/02; C09D 11/10
[52] U.S. Cl. ...................................... 106/22; 523/451; 523/445; 523/453; 523/456; 524/158; 524/376; 524/379; 524/391
[58] Field of Search ............................ 106/22, 287.12; 260/33.2 R, 33.2 EP, 33.2 SB, 33.4 R, 33.4 EP, 33.4 SB

[56] References Cited

U.S. PATENT DOCUMENTS 4,024,096  5/1977  Wachtel ............................ 260/29.3

FOREIGN PATENT DOCUMENTS 1541937  10/1976  United Kingdom .

Primary Examiner—John Kight, III
Assistant Examiner—Amelia B. Yarbrough
Attorney, Agent, or Firm—Oblon, Fisher, Spivak, McClelland & Maier

[57] ABSTRACT

A jet printing ink composition comprises 2 to 60 wt.% of a binder precursor of an alkoxysilane having the formula $R_{4-n}Si(OH)_n$ (n=0 to 2; and R represents a $C_1$-$C_4$ alkoxy group, methoxyethoxy, ethoxyethoxy or phenoxy group) or an oligomer thereof; and 25 to 95 wt.% of a solvent for said alkoxysilane or oligomer thereof; 0.001 to 5 wt.% of a solvent soluble acid; and 0.1 to 8 wt.% of a solvent soluble dyestuff, if necessary, further comprises up to 2 wt.% of a solvent inert silicone oil for inhibiting blotting and up to 3 wt.% of an electroconductive agent.

10 Claims, No Drawings

JET PRINTING INK COMPOSITION

BACKGROUND OF THE INVENTION

1. Field of the Invention

The present invention relates to a jet printing ink composition. More particularly, it relates to a jet printing ink composition having firm adhesiveness on a surface of glass; ceramics such as earthen ware and porcelain; and plastics on which conventional jet printing ink compositions are not easily adhered; and also excellent water resistance, excellent ink droplet stability and uniformity and ink storage stability.

2. Description of the Prior Arts

Recently, various systems for jet print printer have been developed because the jet printing system is a non-impact system having excellent silent property at high speed without any adverse effect caused by a configuration of a printed surface.

For example, the ink jet process is classified to many ink misting type processes such as an Ink On Demand Type process which forms only desired ink droplets from a nozzle by a sudden volumetric change in an ink tank by a piezoelectric element resulting strain by electric pulse signal; an electrostatic attraction type process forming ink droplets from a top of a nozzle under a slight pressure applied to the ink and an electrostatic attractive force; a ultrasonic type process applying ultrasonic wave to an ink in a formation of an ink droplet from a top of a nozzle under an electrostatic attractive force; and a ink droplet type process for applying ultrasonic wave to an ink fed under a pressure.

The process for adhering an ink droplet formed from nozzles having a diameter of several micron meter to several millimeter can be classified as follows;

(1) a process for adhering ink droplets on a surface of a printed product after flying the droplets in a space; and (2) a process for adhering ink droplets under an electric control such as an electric field control process for adhering ink droplets having electric charge on a desired position of a surface of a printed product by flying the ink droplets in an electric field and deviating the ink droplets by the electric field, a charge modulation process for adhering ink droplets having electric charge on a desired position of a surface of a printed product by charging a charge corresponding to a desired deflection by a pulse voltage to deflect the ink droplets in an electric field depending upon the charge of the ink droplets.

Various aqueous or oily ink compositions have been developed as the ink for the jet print printer. Most of the proposed ink compositions have inferior adhesiveness to glass and ceramics such as earthen ware and porcelain and have not satisfactory in a water resistance of a printed symbol or pattern, a dew inhibition and a solvent resistance.

It has been proposed for overcoming these disadvantages to use an ink composition comprising a novolac phenol resin and a small amount of a silane compound as a silane coupling agent as disclosed in U.S. Pat. No. 4,045,397. However, the ink composition comprising a silane coupling agent has not a satisfactory chemical stability, for example, the adhesiveness to glass etc. is remarkably deteriorated and a water resistance of the printed symbol etc. is remarkably deteriorated when the ink composition is used for the jet printing after a long storage.

SUMMARY OF THE INVENTION

It is an object of the present invention to overcome the disadvantages of the conventional jet printing ink compositions.

It is another object of the present invention to provide a jet printing ink composition which has excellent ink droplet stability and uniformity and ink storage stability and also has excellent adhesiveness to glass, ceramics such as earthen ware and porcelain and silicon wafer and excellent water resistance after a long storage.

The foregoing and other objects of the present invention have been attained by providing a jet printing ink composition which comprises 2 to 60 wt. % of a binder precursor of an alkoxysilane having the formula $$R_{4-n}Si(OH)_n$$

($n = 0$ to 2; and R represents a $C_1$–$C_4$ alkoxy group, methoxyethoxy, ethoxyethoxy or phenoxy group) or an oligomer thereof; and 25 to 95 wt. % of a solvent for said alkoxysilane or oligomer thereof; 0.001 to 5 wt. % of a solvent soluble acid; and 0.1 to 8 wt. % of a solvent soluble dyestuff. The jet printing ink composition can include a solvent soluble inert silicone oil and an electroconductive agent.

DETAILED DESCRIPTION OF THE PREFERRED EMBODIMENTS

The alkoxysilanes used as the binder precursors are the alkoxysilanes having the formula $$R_{4-n}Si(OH)_n$$

wherein $n = 0$ to 2; and R represents an alkoxy group, methoxyethoxy or ethoxyethoxy group, or an oligomer thereof. In the formula, R is preferably a group having 1 to 4 carbon atoms such as methoxy, ethoxy, n-propoxy, iso-propoxy, n-butoxy, iso-butoxy, sec-butoxy, tert-butoxy, β-methoxyethoxy, ($CH_3OC_2H_4O$—) and β-ethoxyethoxy ($C_2H_5OC_2H_4O$—) groups.

Suitable alkoxysilanes include tetramethoxysilane, tetraethoxysilane, tetra-n-propoxysilane, tetra-iso-propoxysilane, tetra-n-butoxysilane, tetra-iso-butoxysilane, tetra-sec-butoxysilane, tetra-tert-butoxysilane, tetra(β-methoxyethoxy)silane, tetra(β-ethoxyethoxy)silane, mono-iso-propoxytrimethoxysilane, mono-iso-propoxytriethoxysilane, dimethoxydi-iso-propoxysilane, diethoxydi-iso-propoxysilane, monomethoxytri-iso-propoxysilane, monoethoxytri-iso-propoxysilane, di-iso-propoxydiethoxysilane, di-iso-butoxydimethoxysilane, di-sec-butoxydiethoxysilane, di-sec-butoxydimethoxysilane, di-tert-butoxydimethoxysilane, trimethoxysilanol, triethoxysilanol, tri-n-propoxysilanol, tri-iso-propoxysilanol, tri-n-butoxysilanol, tri-iso-butoxysilanol, tri-sec-butoxysilanol, tri-tert-butoxysilanol, tri(β-methoxyethoxy)silanol, tri(β-ethoxyethoxy)silanol, dimethoxysilanediol, diethoxysilanediol, di-n-propoxysilanediol, di-iso-propoxysilanediol, di-n-butoxysilanediol, di-iso-butoxysilanediol, di-sec-butoxysilanediol and di-tert-butoxysilanediol, etc. One or a mixture thereof can be used. Among the alkoxysilanes, alkoxysilanes having the formula $$R_4Si$$

(R represents an alkoxy group or methoxyethoxy or ethoxyethoxy group) are preferably used.

The alkoxysilane or the oligomer thereof can be used in the present invention.

The oligomers can be chain, ring or branched oligomers of the alkoxysilane having an average condensation degree of about 2 to 5. A mixture thereof can be used.

The alkoxysilane or the oligomer thereof is hydrolyzed and condensed to form a polymer and to adhere firmly the polymer on a surface for printing such as glass whereby this is effective as a binder precursor for an ink composition.

The jet printing ink composition having a viscosity of up to 20 cp at an ambient temperature, usually room temperature, is normally used. It is preferable to have a viscosity of up to 10 cp in view of the injecting property of the ink droplet and the broad viscosity range to the ambient temperature.

From the above-mentioned viewpoint, it is preferable to use the alkoxysilane or the oligomer at a ratio of 2 to 60 wt. % based on the ink composition.

The solvent used for the ink composition of the present invention can be selected from solvents dissolving the alkoxysilane or the oligomer or the other components. It is preferable to use a lower aliphatic alcohol and/or a lower aliphatic alcohol-glycol ether solvent in order to impart effective characteristics for a jet printing ink composition. The lower aliphatic alcohol is effective for an improvement of drying property after the adhesion of the ink composition and also effective for a viscosity reduction. The glycol ether solvent is effective for an improvement of solubilities of the components a prevention of drying at a nozzle of a jet print printer and an improvement of adhesiveness of the ink composition.

Suitable lower aliphatic alcohols include methanol, ethanol and propanol. Suitable glycol ether solvents include ethyleneglycol monomethyl ether, ethyleneglycol monoethyl ether, ethyleneglycol monopropyl ether, ethyleneglycol monobutyl ether, diethyleneglycol monomethyl ether, diethyleneglycol monoethyl ether, diethyleneglycol monopropyl ether and diethyleneglycol monobutyl ether. One or a mixture of the solvents can be used.

An amount of the solvent in the ink composition is in a range of 25 to 95 wt. %. The range is considered in view of a viscosity, a dryness, an adhesiveness of the ink composition and solubilities of the components. When a mixture of the lower aliphatic alcohol and the glycol ether solvent is used as the solvent, it is preferable to combine 0.1 to 10 wt. parts of the glycol ether solvent with 1 wt. part of the lower aliphatic alcohol.

In the present invention, an acid is used as a stabilizer for the alkoxysilane or the oligomer and a condensation accelerator in a drying step to improve the ink storage stability and the ink droplet forming stability as well as to accelerate the dryness and to improve the adhesiveness on glass etc. The acid is important for using the alkoxysilane or the oligomer in stable and effective for a binder of the jet printing ink composition. The solvent soluble acids such as hydrochloric acid, hydrofluoric acid, phosphoric acid, sulfuric acid, boric acid, acetic acid, fumaric acid, benzenesulfonic acid and para-toluenesulfonic acid are effectively used as the acid. One or a mixture of the acids can be used. An amount of the acid is preferably in a range of 0.001 to 5 wt. % (as 100% acid) based on the ink composition in view of the ink stability, the ink mist forming characteristic, the adhesiveness of the ink and the water resistance. When the amount of the acid is less than 0.001 wt. %, the long storage stability of the ink composition is inferior to cause inferior ink droplet forming characteristic. When pH of the ink composition is higher than 5, the ink stability is remarkably inferior. Therefore, it is not preferable to be quite small amount of the acid. It is preferable to incorporate the acid to give pH of lower than 5. On the other hand, excess of 5 wt. % of the acid is useless and further it is not desirable to cause adverse effects to the ink composition, the printed substrate or an ink contacting part of the printer. An amount of the acid is especially preferable in a range of 0.01 wt. % to 5 wt. %.

In the ink composition of the present invention, it is necessary to incorporate a solvent soluble dyestuff. The dyestuffs can be any dyestuffs which have high solubility and high stability in the ink composition.

Suitable dyestuffs include C.I. Solvent Blue 3, C.I. Solvent Orange 40, C.I. Solvent Black 27, C.I. Basic Blue 7, C.I. Solvent Blue 43 and other solvent soluble dyestuffs. Commercially available dyestuffs include Oil Black HBB; Valifast Red 1308; Valifast Orange 209; Valifast Black 1802; Valifast black 3820 (Orient Chemical Co., Ltd.); Spilon Black MHI; Spilon Black GMH; Victoria Pure Blue BOH conc. (Hodogaya Chemical Co., Ltd.).

The dyestuff is incorporated at a ratio of 0.1 to 8 wt. % based on the ink composition. When the amount of the dyestuff is less than 0.1 wt. %, the coloring function as the dyestuff is not satisfactorily imparted, whereas when it is more than 8 wt. %, the further improvement of tinting strength is not given and it causes the clogging of the nozzle by the increase of the solid components in the ink composition.

In the present invention, 0.001 to 2 wt. % of an inert silicone oil is usually incorporated in the ink composition to prevent blotting of the ink composition. The silicone oils are linear organopolysiloxanes having a degree of kinematic viscosity within the range of 0.5–100,000 centistokes (at 25° C.), preferably 0.5–5,000 centistokes (at 25° C.). The silicone oils are commercially available as polyalkylsiloxanes having $C_1$ to $C_{18}$ alkyl group, polyphenylsiloxanes, polyalkylphenylsiloxanes having $C_1$ to $C_{18}$ alkyl group, polyalkylaminoalkylsiloxanes having $C_1$ to $C_{18}$ alkyl group, polyoxyethylenepolyalkylsiloxanes having $C_1$ to $C_4$ alkyl group. Commercially available silicone oils include SH 28PA, SF 8427, SH 3748, SH 3718, SH 21PA, SH 3771, SH 200, SH 3746 (Toray Silicone Co. Ltd.); YH 38680, YF 3842, TSF 437, TSA 4200 (Toshiba Silicone Co., Ltd.); Paintad Q, Paintad M (Dow Corning Corporation). When the silicone oil is incorporated, the blotting can be prevented to give high quality of the printing.

In the other embodiment, a solvent soluble resin can be incorporated beside the above-mentioned components.

The ink composition consisting of the alkoxysilane or the oligomer thereof, the solvent, the solvent soluble acid, the solvent soluble dyestuff and the solvent soluble silicone oil imparts excellent adhesiveness to glass and ceramics, but it has slightly inferior adhesiveness to plastics. In view of various applications of the ink composition, it is preferable to improve the adhesiveness to the plastics. The adhesiveness to plastics is remarkably improved by incorporating a small amount of a solvent soluble resin which is mutually soluble to the alkoxysilane or the oligomer thereof. The resins can be acrylic resins, polyvinyl butyral, novolac phenol resins, shellac or modified shellacs, rosin or modified rosins, cellulose type resins and epoxy resins. It is especially preferable to use acrylic resins, polyvinyl butyral, novolac phenol resins and epoxy resins.

The syntheses of the resins are describe in "Organic Coating Technology" published by John Wiley & Sons, Inc. and "Paint Technology Manuals (part I–III)" published on behalf of Oil & Colour Chemists' Association by Chapman & Hall.

The solvent soluble resin is incorporated at a ratio of up to 5 wt. % based on the ink composition and at a ratio of up to the content of the alkoxysilane or the oligomer thereof.

When the amount of the solvent soluble resin is more than 5 wt. %, the viscosity of the ink composition is too high to be suitable for the jet printing ink composition and the water resistance after the printing and drying is disadvantageously inferior. When the amount of the solvent soluble resin is more than the amount of the alkoxysilane or the oligomer, the adhesiveness of the ink composition is disadvantageously inferior.

A solvent soluble electroconductive agent can be incorporated in the ink composition.

When the jet printing ink composition is used for the abovementioned electric controlling system it is necessary to incorporate the electroconductive agent which improves the electroconductivity of the ink composition and the charging characteristic of the ink composition to quickly charge the ink composition to perform precisely, quickly the printing.

Suitable solvent soluble electroconductive agents include lithium chloride, ammonium chloride, lithium nitrate, ammonium nitrate, aluminum nitrate, lithium nitrate, ammonium nitrite, lithium acetate, ammonium acetate, potassium acetate, potassium thiocyanate, ammonium thiocyanate, sodium thiocyanate, and dimethylamine hydrochloride. It is especially preferable to use lithium chloride, ammonium chloride, lithium nitrate, ammonium nitrate, dimethylamine hydrochloride, ammonium thiocyanate, potassium thiocyanate and sodium thiocyanate. One or a mixture of the electroconductive agents can be used.

The electroconductive agent is incorporated at a ratio of up to 3 wt. % preferably 0.1 to 3 wt. % based on the ink composition. In such case, the relative resistance of the ink composition is up to 2,000 Ω cm to impart excellent printing characteristic. When the amount of the electroconductive agent is more than 3 wt. %, it is not economical and a precipitate may cause in the ink composition.

It is possible to incorporate water at a ratio of up to 10 wt. % based on the alkoxysilane or the oligomer thereof in order to improve the hydrolysis of the alkoxysilane or the oligomer thereof and to improve dryness of the ink composition.

It is also possible to incorporate a fine pigment, a fluorescent dyestuff, a heat-sensitive dyestuff and the other additive if desired.

The components are mixed with stirring to form a uniform composition in the preparation of the jet printing ink composition.

The resulting ink composition can be used in various ink mist forming processes and ink droplet controlling processes.

The jet printing ink composition of the present invention can be dried by a spontaneous drying process and also a heat drying process and it can be also used as a steam set ink for drying it to apply steam to the printed surface.

The jet printing ink composition of the present invention does not cause clogging at the nozzle and prevents repelling and blotting on the printed surface to prepare a printed product having excellent adhesiveness to surfaces of glass, ceramics such as earthen ware and porcelain and plastics are excellent industrial effects.

The present invention will be further illustrated by certain examples and references which are provided for purposes of illustration only and are not intended to be limiting the present invention.

EXAMPLES 1–5

The components shown in Table 1 were uniformly mixed with stirring to prepare each ink mixture. The ink mixture was filtered by a membrane filter made of polytetrafluoroethylene having pore size of $1.0\mu$ to prepare each jet printing ink composition.

The ink composition was tested by an electrostatic deflection type ink jet printer to study conditions of an ink droplet formation, an ink droplet electric charge and an electrostatic deflection as printing tests. Excellent results were found. Moreover, the ink composition was tested to study an adhesiveness to glass and porcelain, a water resistance and an adhesiveness to plastic. The results are shown in Table 2.

Each ink composition was stored in a bottle made of polyethylene under a sealing condition at 40° C. for 1 month and then, the same printing tests were carried out. Excellent results were also found. The stored ink composition was also tested to study adhesiveness and a water resistance. The results are shown in Table 2.

REFERENCE 1

An ink composition shown in Table 1 was prepared by using a silane coupling agent (γ-glycidoxypropyl trimethoxysilane) (KBM-403 manufactured by Shin-Etsu Chemical Industry Co., Ltd.).

The same printing tests as those of Examples were carried out. The test results were good. However, the test results of adhesivenesses and water resistance of the ink at the time of the preparation and after storage for 1 month were inferior as shown in Table 2.

REFERENCE 2

An ink composition was prepared by using 10 wt. parts of a water soluble acryl resin solution, 18 wt. parts of ethanol, 5 wt. parts of ethyleneglycol monomethyl ether, 65 wt. parts of water, 2 wt. parts of dyestuffs (Direct Black 19) and 0.2 wt. part of lithium chloride. The resulting ink composition was tested by the same tests for adhesivenesses and water resistance. The results are shown in Table 2.

TABLE 1

| | (wt. part) | | | | | |
|---|---|---|---|---|---|---|
| Component | Exp. 1 | Exp. 2 | Exp. 3 | Exp. 4 | Exp. 5 | Ref. 1 |
| Silicon compounds: | | | | | | |
| Tetraethoxysilane | 6 | | | | | |
| Tetra-n-propoxysilane | | 15 | | | | |
| Diethoxydi-iso-propoxy-silane | | | 29 | | | |
| Tetraethoxyethoxysilane | | | | 24 | | |
| Tetraethoxysilane | | | | | | |

TABLE 1-continued

| Component | Exp. 1 | Exp. 2 | Exp. 3 | Exp. 4 | Exp. 5 | Ref. 1 |
|---|---|---|---|---|---|---|
| oligomer (1) | | | | 16 | 10 | |
| Silane coupling agent (γ-aminopropyltriethoxy silane) | | | | | | 0.5 |
| Resins: | | | | | | |
| Polyvinyl butyral (2) | 0.5 | | | | | |
| Acrylic resin (3) | | 1 | | | | |
| Novolac phenol resin (4) | | | 3 | | | 5 |
| Epoxy resin (5) | | | | 1 | | |
| Solvents: | | | | | | |
| Ethyleneglycol monoethyl ether | 61 | 46 | 34 | 25 | 43 | 54 |
| Ethyleneglycol monobutyl ether | | 5 | | | | |
| Diethyleneglycol monomethyl ether | | | | 13 | | |
| Ethanol | 30 | 27 | | | 31 | 37 |
| Methanol | | | 29 | 31 | | |
| Electroconductive agents: | | | | | | |
| Lithium chloride | 1 | | | | 1 | 1 |
| Lithium nitrate | | 1.2 | | 1 | | |
| Potassium thiocyanate | | | 1.5 | | | |
| Acids: | | | | | | |
| 10% sulfuric acid | | 0.6 | 0.4 | | 0.5 | |
| Boric acid | | 1.3 | | 0.5 | | |
| Hydrochloric acid | 0.2 | | | 0.2 | | |
| Para-toluenesulfonic acid | | | 0.3 | | | |
| Soluble silicone oil: | | | | | | |
| Soluble silicone oil (6) | | 0.01 | | | 0.05 | |
| Soluble silicone oil (7) | | | 0.5 | | | 0.5 |
| Soluble silicone oil (8) | 0.05 | | | | | |
| Soluble silicone oil (9) | | | | 0.5 | | |
| Dyestuff: | | | | | | |
| Dyestuff (I) (10) | | 2 | 2.5 | | | |
| Dyestuff (II) (11) | 1.5 | | | | | 2 |
| Dyestuff (III) (12) | | | | 2 | | |
| Dyestuff (IV) (13) | | | | | 1 | |

Note:
(1) Colcoat #40 (Nippon Colcoat Chemical K.K.)
(2) S-LEC BL-S (Sekisui Kagaku Kogyo K.K.)
(3) Copolymer of ethyl methacrylate and 2-hydroxyethyl methacrylate weight average molecular weight of 10,000.
(4) PP5122 (Gunei Kagaku K.K.)
(5) Epikote #1001 (Shell Chemical Co., Ltd.)
(6) Polymethylaminomethylsiloxane (35 centistokes at 25° C.)
(7) Polyoxyethylenepolymethylsiloxane (1,700 centistokes at 25° C.)
(8) Polyoxyethylenepolymethylsiloxane (400 centistokes at 25° C.)
(9) Polyoxyethylenepolymethylsiloxane (1,000 centistokes at 25° C.)
(10) C.I. Basic Blue 7
(11) C.I. Solvent Blue 43
(12) C.I. Solvent Orange 40
(13) C.I. Solvent Black 27

TABLE 2

| | Exp. 1 | Exp. 2 | Exp. 3 | Exp. 4 | Exp. 5 | Ref. 1 | Ref. 2 |
|---|---|---|---|---|---|---|---|
| Adhesiveness: | | | | | | | |
| Just after preparation of ink | | | | | | | |
| Glass | 4 | 4 | 4 | 4 | 4 | 4 | 2 |
| Porcelain | 4 | 4 | 4 | 4 | 4 | 4 | 2 |
| After storage for 1 month at 40° C. | | | | | | | |
| Glass | 4 | 4 | 4 | 4 | 4 | 2 | 2 |
| Porcelain | 4 | 4 | 4 | 4 | 4 | 2 | 2 |
| Water resistance: | | | | | | | |
| Just after preparation of ink | | | | | | | |
| Glass | 4 | 4 | 4 | 5 | 4 | 3 | 1 |
| Porcelain | 4 | 4 | 4 | 4 | 4 | 3 | 1 |
| After storage for month at 40° C. | | | | | | | |
| Glass | 3 | 4 | 4 | 5 | 3 | 1 | 1 |
| Porcelain | 4 | 4 | 4 | 4 | 4 | 2 | 1 |
| Adhesiveness: | | | | | | | |
| Polyethyleneterephthalate | 4 | 4 | 4 | 3 | 4 | 4 | 4 |
| Rigid polyvinylchloride | 4 | 4 | 4 | 3 | 4 | 4 | 4 |

Rating:
5: Excellent
4: Good
3: Fair
2: Removing by rubbing
1: Natural peeling off in dipping into water

EXAMPLES 6 to 10

In accordance with the process of Example 1 except using the components shown in Table 3, each ink composition was prepared, and comparative tests were carried out. The results are shown in Table 4.

TABLE 3

| Component | Exp. 6 | Exp. 7 | Exp. 8 | Exp. 9 | Exp. 10 |
|---|---|---|---|---|---|
| Silicon compounds: | | | | | |
| Tetraethoxysilane | | 12 | | | |
| Tetra-n-propoxysilane | | | 25 | | |
| Diethoxydi-iso-propoxysilane | | | | 10 | |
| Tetraethoxyethoxysilane | | 14 | | | |
| Tetraethoxysilane oligomer | 30 | | | | 16 |
| Solvents: | | | | | |
| Ethyleneglycol monoethyl ether | 50 | | 40 | | 50 |
| Ethyleneglycol monobutyl ether | | 10 | | 20 | 20 |
| Diethyleneglycol monomethyl ether | | 40 | | 30 | |
| Ethanol | 5 | 20 | 25 | 20 | |
| Methanol | 10 | | 6 | 15 | 10 |
| Electroconductive agents: | | | | | |
| Ammonium chloride | | | 1.0 | | |
| Ammonium nitrate | | | | 1.0 | |
| Acid: | | | | | |
| 10% sulfuric acid | | | 0.2 | | 0.1 |
| 10% phosphoric acid | 3.0 | 0.8 | | | |
| Fumaric acid | | | | 0.1 | 1.0 |
| Hydrochloric acid | 0.1 | | 0.2 | | |
| Acetic acid | | | | 1.0 | |
| Soluble silicone oil: | | | | | |
| Soluble silicone oil (6) | | | | 0.03 | |
| Soluble silicone oil (7) | | | 0.02 | | |
| Soluble silicone oil (8) | 0.02 | 0.1 | | | |
| Soluble silicone oil (9) | | | | | 0.1 |
| Dyestuff: | | | | | |
| Dyestuff (I) (10) | 2 | | | 3 | |
| Dyestuff (II) (11) | | 3 | | | |
| Dyestuff (III) (12) | | | | | 2 |
| Dyestuff (IV) (13) | | | 2 | | |

TABLE 4

| | Exp. 6 | Exp. 7 | Exp. 8 | Exp. 9 | Exp. 10 |
|---|---|---|---|---|---|
| Adhesiveness: | | | | | |
| Just after preparation of ink | | | | | |
| Glass | 4 | 4 | 4 | 4 | 4 |
| Porcelain | 4 | 4 | 4 | 4 | 4 |
| After storage for 1 month at 40° C. | | | | | |
| Glass | 3 | 3 | 4 | 4 | 4 |
| Porcelain | 3 | 3 | 4 | 4 | 4 |
| Water resistance: | | | | | |
| Just after | | | | | |

TABLE 4-continued

| | Exp. 6 | Exp. 7 | Exp. 8 | Exp. 9 | Exp. 10 |
|---|---|---|---|---|---|
| preparation of ink | | | | | |
| Glass | 4 | 4 | 4 | 5 | 4 |
| Porcelain | 4 | 4 | 4 | 4 | 4 |
| After storage for month at 40° C. | | | | | |
| Glass | 4 | 4 | 4 | 5 | 4 |
| Porcelain | 4 | 4 | 4 | 4 | 4 |
| Adhesiveness: | | | | | |
| Polyethyleneterephthalate | 3 | 3 | 3 | 3 | 3 |
| Rigid polyvinylchloride | 3 | 3 | 3 | 3 | 3 |

Rating:
5: Excellent
4: Good
3: Fair
2: Removing by rubbing
1: Natural peeling off in dipping into water As it is clearly found from the results, the jet printing ink compositions of the present invention had excellent adhesiveness to surfaces of printed substrates such as glass surface and excellent water resistance at the time of the preparation and after the storage for a long time.

On the contrary, the ink compositions of the References had inferior adhesiveness to surfaces of printed substrates and inferior water resistance after the storage for a long time.

We claim:

1. A jet printing ink composition, which comprises:
   (a) from 2 to 60 wt % of a binder precursor of an alkoxysilane having the formula: $R_{4-n}Si(OH)_n$; wherein n is 0 to 2 and R is a $C_1$-$C_4$ alkoxy group, methoxyethoxy, ethoxyethoxy or phenoxy; or an oligomer thereof;
   (b) from 25 to 95 wt % of a solvent for said alkoxysilane or oligomer thereof selected from the group consisting of a lower aliphatic alcohol, a glycol monoether and mixtures thereof;
   (c) from 0.001 to 5 wt % of a solvent soluble acid selected from the group consisting of hydrochloric acid, hydrofluoric acid, sulfuric acid, boric acid, phosphoric acid, fumaric acid, benzenesulfonic acid, paratoluenesulfonic acid and mixtures thereof; and
   (d) from 0.1 to 5 wt % of a solvent soluble dyestuff.

2. The composition of claim 1, which further comprises up to 2 wt % of a solvent soluble inert silicone oil which inhibits blotting.

3. The composition of claim 1 which further comprises up to 3 wt % of an electroconductive agent.

4. The composition of claim 1, 2 or 3, wherein said binder precursor is an alkoxysilane having the formula $R_4Si$, wherein R is a $C_1$-$C_4$ alkoxy group, methoxyethoxy, ethoxyethoxy or phenoxy, or an alogomer thereof.

5. The composition of claim 1, 2 or 3, wherein said electroconductive agent is a salt selected from the group consisting of lithium chloride, ammonium chloride, lithium nitrate, ammonium nitrate, dimethylaminehydrochloride, potassium thiocyanate, ammonium thiocyanate, sodium thiocyanate, and mixtures thereof.

6. The composition of claim 1, 2 or 3, which further comprises 5 wt % of a solvent soluble resin.

7. The composition of claim 6, wherein said solvent soluble resin is an acrylic resin, a polyvinylbutyral resin, a novolak phenol resin or an epoxy resin.

8. The composition of claim 1, wherein said alkoxysilane is tetramethoxysilane, tetraethoxysilane, tetra-n-propoxysilane, tetra-iso-propoxysilane, tetra-n-butoxysilane, tetra-iso-butoxysilane, tetra-sec-butoxysilane, tetra-t-butoxysilane, tetra($\beta$-methoxyethoxy)silane, tetra($\beta$-ethoxyethoxy)silane, mono-iso-propoxytrimethoxy-silane, mono-iso-propoxytriethoxysilane, dimethoxydi-iso-propoxysilane, diethoxydi-iso-propoxysilane, monomethoxytri-iso-propoxysilane, monoethoxytri-iso-propoxysilane, di-iso-propoxydiethoxysilane, di-iso-butoxydimethoxysilane, di-sec-butoxydiethoxysilane, di-sec-butoxydimethoxysilane, di-tert-butoxydimethoxysilane, trimethoxysilanol, triethoxysilanol, tri-n-propoxy-silanol, tri-iso-propoxysilanol, tri-n-butoxysilanol, tri-iso-butoxysilanol, tri-sec-butoxysilanol, tri-tert-butoxysilanol, tri($\beta$-methoxyethoxy)silanol, tri($\beta$-ethoxyethoxy)silanol, dimethoxysilanediol, diethoxysilanediol, di-n-propoxysilanediol, di-iso-propoxysilanediol, di-n-butoxysilanediol, di-iso-butoxysilanediol, di-sec-butoxysilanediol, di-tert-butoxysilanediol, or mixtures thereof.

9. The composition of claim 1, wherein said alkoxysilane oligomer has an average condensation degree of about 2 to 5.

10. The composition of claim 1, wherein said lower aliphatic alcohol is methanol, ethanol or propanol and said glycol monoether is ethyleneglycol monomethyl ether, ethyleneglycol monoethyl ether, ethyleneglycol monopropyl ether, ethyleneglycol monobutyl ether, diethyleneglycol monomethyl ether, diethyleneglycol monoethyl ether, diethyleneglycol monopropyl ether and diethyleneglycol monobutyl ether, or mixtures thereof.

* * * * *